US012214705B2

(12) United States Patent
Habert et al.

(10) Patent No.: US 12,214,705 B2
(45) Date of Patent: Feb. 4, 2025

(54) ASSEMBLY FOR A VEHICLE INTERIOR COMPRISING AT LEAST ONE ARMREST AND VEHICLE INTERIOR COMPRISING SUCH AN ASSEMBLY

(71) Applicant: FAURECIA INTERIEUR INDUSTRIE, Nanterre (FR)

(72) Inventors: Cédric Habert, Essuiles (FR); Jérémy Floc'h, Allonne (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 0 days.

(21) Appl. No.: 17/958,286

(22) Filed: Sep. 30, 2022

(65) Prior Publication Data
US 2023/0097218 A1 Mar. 30, 2023

(30) Foreign Application Priority Data
Sep. 30, 2021 (FR) .................................. 21 10311

(51) Int. Cl.
*B60N 2/07* (2006.01)
*B60N 2/56* (2006.01)
*B60N 2/75* (2018.01)

(52) U.S. Cl.
CPC ........... *B60N 2/793* (2018.02); *B60N 2/5678* (2013.01); *B60N 2/78* (2018.02)

(58) Field of Classification Search
CPC ........ B60N 2/793; B60N 2/5678; B60N 2/78; B60N 2/5685; B60N 2/79; B60N 2/77
USPC .............................................. 248/118, 118.3
See application file for complete search history.

(56) References Cited

U.S. PATENT DOCUMENTS

| | | | | |
|---|---|---|---|---|
| 4,165,901 A | * | 8/1979 | Swenson | B60N 2/77 297/411.33 |
| 4,244,623 A | * | 1/1981 | Hall | A47C 1/03 297/162 |
| 4,307,913 A | * | 12/1981 | Spiegelhoff | B60N 2/77 297/115 |

(Continued)

FOREIGN PATENT DOCUMENTS

| | | |
|---|---|---|
| DE | 10161422 A1 | 6/2003 |
| EP | 2003015 A2 | 12/2008 |

(Continued)

OTHER PUBLICATIONS

French Search Report for application No. FR 2110311, dated May 19, 2022, 2 pages.

*Primary Examiner* — Muhammad Ijaz
(74) *Attorney, Agent, or Firm* — Reising Ethington P.C.

(57) ABSTRACT

An assembly for a vehicle interior includes at least one armrest each presenting a receiving surface for the elbow and/or forearm of an occupant of the vehicle interior and a support for the armrest. Each armrest has a panel movable in translation relative to the support according to an elevation direction between a first position and a second position. For each armrest, the movable panel of that armrest includes an upper panel portion at least partially delimiting the receiving surface of that armrest extending in a first plane, and a side panel portion separate from the upper panel portion extending in a second plane, different from the first plane, the side panel portion having a heating element configured, when activated, to diffuse heat.

10 Claims, 3 Drawing Sheets

(56) References Cited

U.S. PATENT DOCUMENTS

| | | | | |
|---|---|---|---|---|
| 6,017,091 | A * | 1/2000 | Cao | A47C 1/03 297/411.37 |
| 6,974,189 | B2 * | 12/2005 | Machael | A47C 1/03 297/411.36 |
| 8,439,437 | B2 * | 5/2013 | Akai | A47C 7/54 297/180.12 |
| 11,641,946 | B2 * | 5/2023 | Antonucci | A47C 16/00 248/118 |
| 11,825,766 | B1 * | 11/2023 | Crowl | B60N 2/767 |
| 2019/0389352 | A1 * | 12/2019 | Koller | B60N 2/0029 |
| 2020/0376996 | A1 * | 12/2020 | Planson | B60N 2/77 |
| 2022/0204166 | A1 * | 6/2022 | Hoover | B64D 11/0646 |
| 2023/0038501 | A1 * | 2/2023 | Kim | B60N 2/767 |
| 2023/0097218 | A1 * | 3/2023 | Habert | B60N 2/79 248/118 |
| 2023/0191968 | A1 * | 6/2023 | Lee | B60N 2/02253 297/411.3 |
| 2024/0149770 | A1 * | 5/2024 | Smith | B60N 2/793 |

FOREIGN PATENT DOCUMENTS

| | | |
|---|---|---|
| JP | S55160522 A | 12/1980 |
| WO | 2015105858 A1 | 7/2016 |

* cited by examiner

ASSEMBLY FOR A VEHICLE INTERIOR COMPRISING AT LEAST ONE ARMREST AND VEHICLE INTERIOR COMPRISING SUCH AN ASSEMBLY

CROSS-REFERENCE TO RELATED APPLICATION

This patent application claims the benefit of FR 2110311 filed on Sep. 30, 2021, which is hereby incorporated by reference.

TECHNICAL FIELD

The present invention relates to an assembly for a vehicle interior of the type comprising at least one armrest presenting a receiving surface for the elbow and/or forearm of an occupant of the vehicle interior and a support for the or each armrest, the or each armrest comprising a panel movable in translation relative to the support in an elevation direction between a first position and a second position.

The present invention further relates to a vehicle interior comprising such an assembly.

The assembly according to at least some embodiments of the invention is configured to be arranged in a motor vehicle interior. The assembly may also be suitable for any other vehicle configured to carry people, such as a railway vehicle, bus, streetcar, boat, aircraft, etc.

BACKGROUND

In particular, it is known in thermal motor vehicles to use the heat released by the engine to heat an interior of the vehicle. This heat is diffused into the interior of the vehicle by means of diffusion mechanisms, such as nozzles or aerators.

However, it has been found that the heating time of the vehicle interior is relatively long. The thermal comfort of the occupants of the vehicle is therefore degraded.

Moreover, the adjustment of the direction of the heat flow diffused in the passenger compartment is relatively complex.

However, thermal comfort is an increasingly important parameter for the occupants of a vehicle.

One of the objects of the invention is to alleviate these drawbacks by proposing an assembly for a vehicle interior improving the thermal comfort of the occupants of the vehicle interior.

SUMMARY

To this end, the invention relates to an assembly for a vehicle interior of the aforementioned type in which, for the or each armrest, the movable panel of this armrest comprises an upper panel portion delimiting at least in part the receiving surface of this armrest, the upper panel portion extending in a first plane, the movable panel of this armrest further comprising a side panel portion separate from the upper panel portion, extending in a second plane different from the first plane, the side panel portion comprising a heating element configured, when activated, to diffuse heat.

By virtue of the fact that the heating element is comprised in the side panel portion of the movable panel of the armrest and that the movable panel is adjustable according to the direction of elevation, an occupant of the vehicle interior can adjust the position of the heating element to diffuse heat to the desired location. In addition, the position of the heating element is particularly easy to adjust. Indeed, it is sufficient to move the panel according to the direction of elevation.

In addition, because the heating element is arranged in the side panel portion, it is possible to arrange this side panel portion opposite a seating area of the vehicle interior so that the heating element diffuses heat towards the seating area.

The assembly according to at least some embodiments of the invention thus creates a thermal bubble around the seating area and thus improves the comfort of the occupants of the vehicle interior.

In addition, the heating element adds an independent heat source to the vehicle interior, thereby reducing the heating time of the vehicle interior. Furthermore, such a heating element is suitable for both thermal and electric vehicles in which the engine heat cannot be used for heating the vehicle interior.

Finally, the fact that the heating element is integrated into the armrest allows to obtain a compact and easily integrable unit in a vehicle interior. In addition, the fact that the armrest presents a side panel portion extending in a second plane, the armrest is easily integrated into generally unused areas of the vehicle interior such as the area between a center console of the vehicle interior and a seating area or between a side door panel and a seating area.

According to other aspects of the invention, the assembly for a vehicle interior comprises one or more of the following features, taken alone or in any possible technical combination:
  the movable panel presents a substantially "L" shaped section.
  in the first position, a first distance is defined between the support and the upper panel portion, and, in the second position, a second distance is defined between the support and the upper panel portion, the first distance being strictly less than the second distance.
  the assembly comprises, for the or each armrest, at least one linkage mechanism connecting the movable panel of this armrest to the support, the linkage mechanism comprising a sliding link.
  the assembly comprises two armrests, the support supporting the mobile panel of each of the two armrests.
  the second plane extends substantially according to the direction of elevation Z.
  the or each armrest is a center console armrest or a door panel armrest of the vehicle interior.
  the heating element is a heating mat integrated into the side panel portion.
  the heating element extends substantially in the second plane, the heating element presenting an area comprised between 200 cm$^2$ and 500 cm$^2$.
  the heating element is configured to be controlled according to a control law, the control law comprising activating the heating element when the position of the movable panel is separate from the first position.

The invention relates, also, to a vehicle interior comprising at least one seating area for receiving at least a portion of a body of an occupant of the vehicle interior and at least one assembly as previously described, the upper panel portion of the movable panel of the armrest of the assembly being for receiving the elbow and/or the forearm of an occupant received in the seating area.

According to other aspects of the invention, the vehicle interior comprises one or more of the following features, taken alone or according to any possible technical combination:
  the support of the assembly comprises a portion of a center console or door panel of the vehicle interior.

the vehicle interior comprises at least two seating areas and at least one center console arranged between the two seating areas, the assembly comprising two armrests, each armrest being associated with a separate seating area among the two seating areas, the support of the assembly supporting the movable panel of each of the two armrests and comprising a part of the center console, for each armrest, the upper panel portion of the movable panel of that armrest being intended to receive the elbow and/or forearm of an occupant received in the associated seating area, and the side panel portion of the movable panel of that armrest comprising the heating element being configured to be arranged opposite the associated seating area.

the vehicle interior comprises at least one door panel arranged on a side of the at least one seating area, the vehicle interior comprising at least one additional vehicle assembly, the support of the additional vehicle assembly comprising a portion of the door panel.

BRIEF DESCRIPTION OF THE DRAWINGS

Further aspects and advantages of the invention will become apparent from the following description, given by way of example and made with reference to the appended drawings, of which.

DETAILED DESCRIPTION

Figure 1:
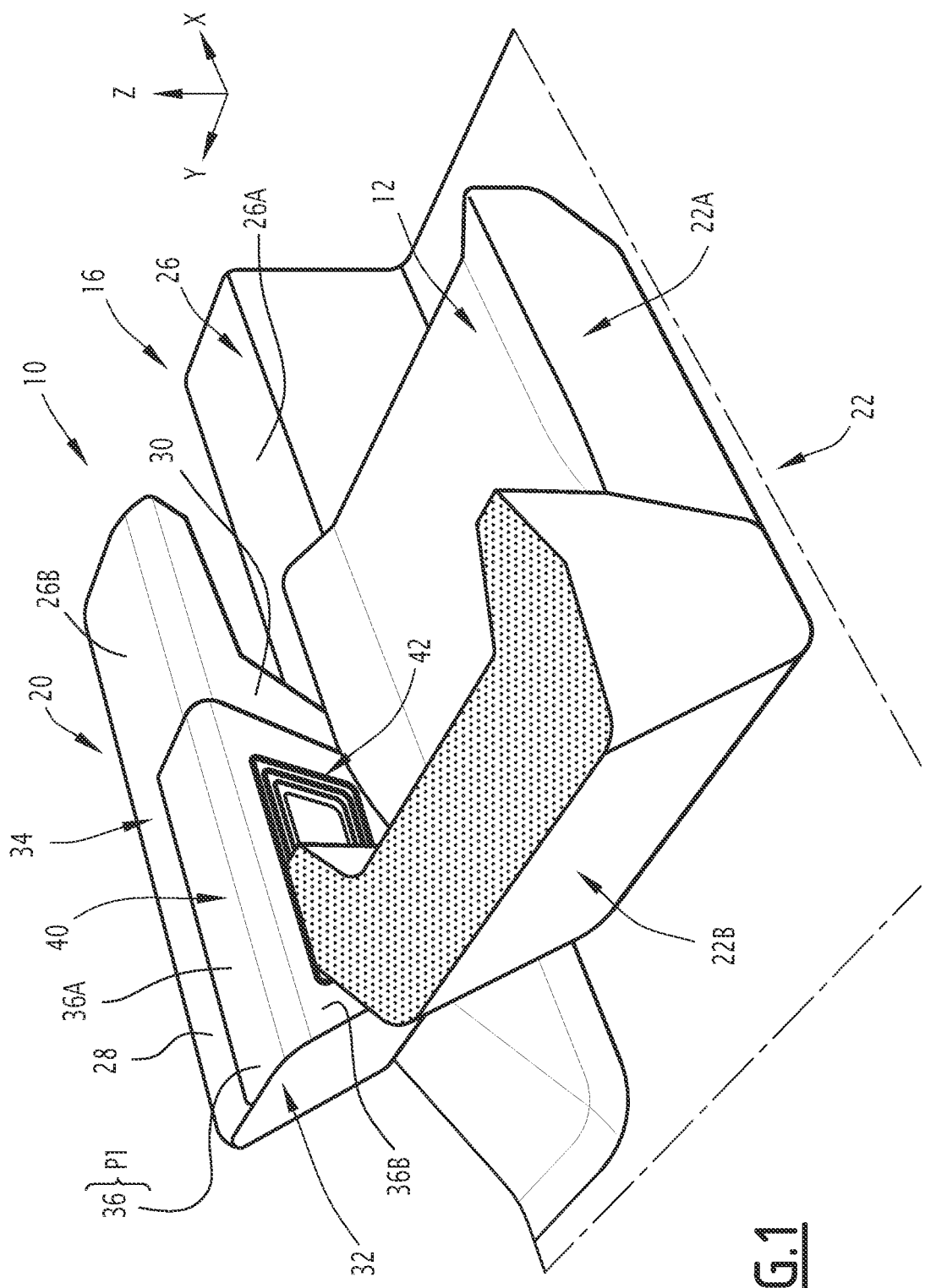
FIG. 1 is a schematic perspective view of a part of a vehicle interior according to a first embodiment, the vehicle interior comprising an assembly including an armrest comprising a movable panel in a first position.

Throughout the following, orientations are the usual orientations of a motor vehicle. Thus, the terms "upper", "lower", "front", "rear", "right" and "left" are understood to refer to the normal direction of travel of a motor vehicle relative to the position of a driver manually operating the vehicle. Similarly, the longitudinal direction X is defined as the normal direction of travel of the vehicle corresponding to the length of the vehicle. The transverse direction Y is defined as substantially perpendicular to the longitudinal direction X corresponding to the width of the vehicle. The elevation direction Z is substantially perpendicular to the longitudinal direction X and the transverse direction Y and corresponds to the height of the vehicle.

A motor vehicle interior 10 according to a first embodiment is described with reference to FIGS. 1 and 2. Such a vehicle interior 10, also known as a "vehicle passenger compartment", corresponds to the interior space of the vehicle in which the vehicle occupants are accommodated. Hereinafter, the vehicle interior 10 may be interchangeably referred to as the "passenger compartment 10".

Although the present description of the passenger compartment 10 is made in relation to a motor vehicle passenger compartment, the passenger compartment 10 could be a passenger compartment of any other vehicle configured to carry people, such as a railway vehicle, bus, streetcar, boat, aircraft, etc.

The vehicle interior 10 includes at least one seating area 12, a center console 16 and at least one vehicle assembly 20.

The or each seating area is configured to receive at least a portion of a body of an occupant of the passenger compartment 10.

Figure 2:
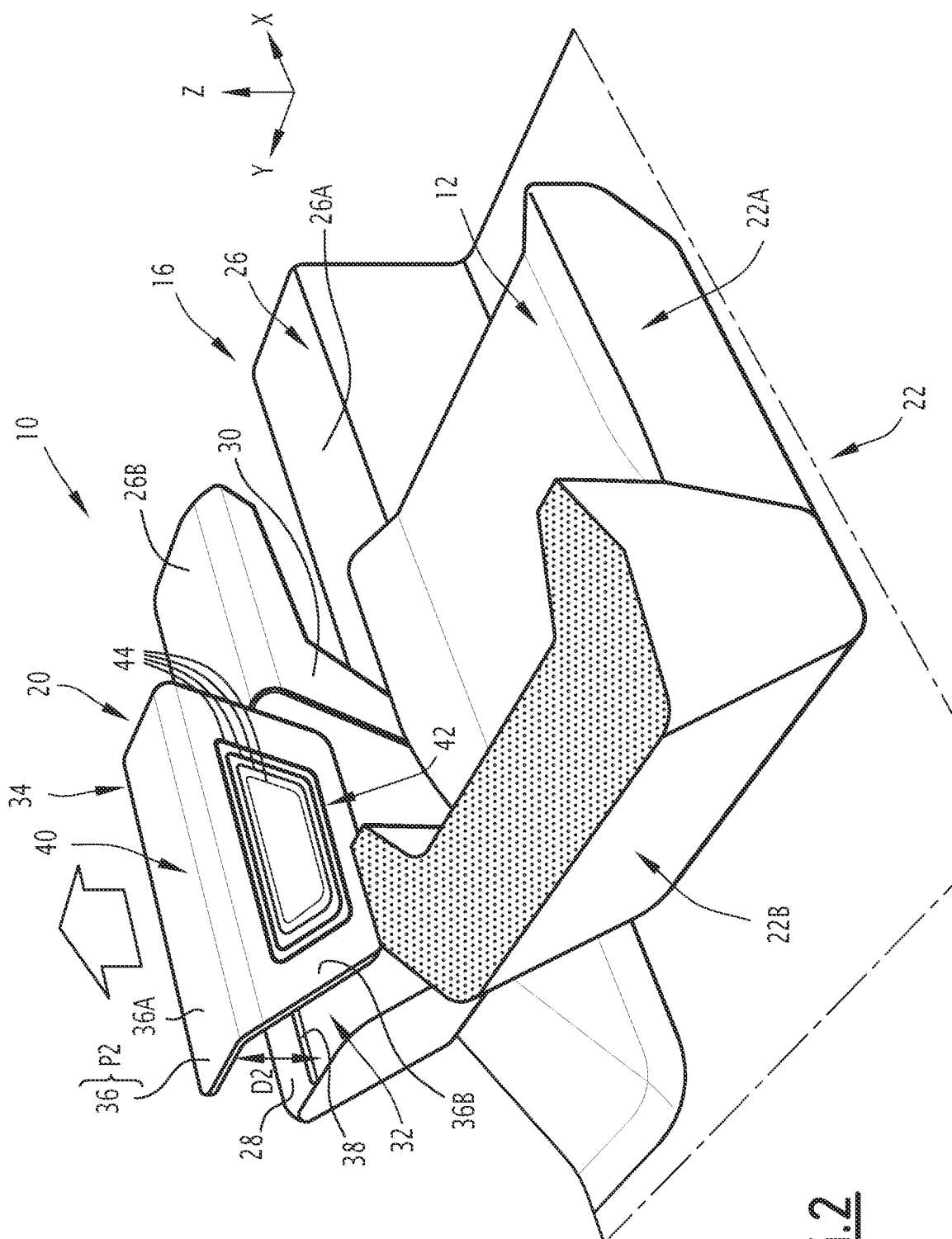
FIG. 2 is a perspective view of part of the vehicle interior of FIG. 1 in which the movable panel of the armrest is in a second position separate from the first position.

The or each seating area is, for example, as illustrated in FIGS. 1 and 2, an area of a vehicle seat.

Alternatively, the or each seating area is an area of a bench seat of the vehicle passenger compartment 10.

The or each seating area extends, for example, substantially perpendicular to the elevation direction Z.

For example, the passenger compartment 10 comprises at least two seating areas arranged side-by-side, hereinafter referred to as "first seating area 12" and "second seating area". Only the first seating area 12 is visible in FIGS. 1 and 2. In the illustrated example, the first seating area 12 and the second seating area are arranged side by side according to the transverse direction Y.

In the example illustrated in FIGS. 1 and 2, the first seating area 12 is part of a seat 22 of the passenger compartment 10, hereinafter referred to as "first seat 22". As visible in FIGS. 1 and 2, the first seat 22 comprises a backrest 22B separate from the first seating area 12.

For example, the first seat 22 is a front passenger seat of the vehicle.

The second seating area is, for example, part of a second seat (not visible in FIGS. 1 and 2) of the passenger compartment 10.

For example, the second seat is a driver's seat.

The center console 16 extends substantially according to the longitudinal direction X, at least between the first seating area 12 and the second seating area.

The center console 16 comprises a body 26.

By way of example, the body 26 comprises a base 26A and a console portion 26B in projection relative to the base 26A.

The base 26A extends substantially according to the longitudinal direction X.

The projecting console portion 26B extends projecting from the base 26A according to the elevation direction Z. A length of the projecting console portion 26B is, for example, less than a length of the base 26A. In the present application, the length of a component of the passenger compartment 10 corresponds to the dimension of this component according to the longitudinal direction X.

The projecting console portion 26B presents, for example, substantially an inverted pyramid shape.

The projecting console portion 26B comprises, for example, an upper face 28 and at least two side faces 30.

The upper face 28 is substantially perpendicular to the elevation direction Z.

Each side face 30 is advantageously arranged opposite a separate seating area.

As an example, the two side faces 30 of the projecting console portion 26B are arranged opposite each other according to the transverse direction Y.

By way of illustration, the two side faces 30 of the projecting console portion 26B extend in a plane inclined relative to the elevation direction Z. For example, such an inclined plane presents an angle comprised between 20 degrees and 40 degrees with the elevation direction Z, preferably an angle comprised between 25 degrees and 35 degrees with the elevation direction Z, such as an angle of 30 degrees with the elevation direction Z.

Alternatively, the two side faces 30 of the projecting console portion 26B extend substantially according to the elevation direction Z. Furthermore, for example, the two side faces 30 are substantially perpendicular to the transverse direction Y.

The vehicle assembly 20 comprises a support 32 for at least one armrest 34, at least one armrest 34 comprising a movable panel 36, movable between a first position P1 and a second position P2, and at least one mechanism for connecting the armrest 34 to the support 32.

The or each armrest 34 is, for example, a center console armrest or a door panel armrest of the passenger compartment 10. In other words, each armrest 34 is either a center console armrest or a door panel armrest.

The support for the or each armrest 34 is a portion of a center console or door panel of the vehicle interior 10.

In the present case, the armrest 34 is a center console armrest.

The support 32 is configured to support the armrest 34.

The shape of the support 32 is adapted to support the armrest 34. In addition, the support 32 presents a rigidity suitable for supporting the armrest 34.

In the example shown in FIGS. 1 and 2, the support 32 comprises a portion of the center console 16. By way of example, the support 32 comprises a portion of the body 26 of the center console 16 and, more specifically, at least one area of the projecting console portion 26B.

By way of illustration, the support 32 presents at least one receiving notch 38 (visible in FIG. 2) for the movable panel 36 in the first position P1. The receiving notch 38 is, for example, a recessed area of the support 32.

In the particular example described, as visible in FIG. 2, the receiving notch 38 is provided in the body 26 of the center console 16. For example, the receiving notch 38 extends into the upper face 28 of the projecting console portion 26B as well as into one of the side faces 30 of the projecting console portion 26B.

Alternatively, the support 32 is separate from the center console 16 and attached to the center console 16.

In the example illustrated in FIGS. 1 and 2, the assembly 20 comprises a single armrest 34. In other embodiments, the assembly 20 could comprise, for example, at least two armrests.

The armrest 34 is advantageously associated with a seating area of the passenger compartment 10.

In the present example visible in FIGS. 1 and 2, the seating area associated with the armrest 34 is the first seating area 12.

The armrest 34 presents a receiving surface 40 for the elbow and/or a forearm of an occupant of the vehicle interior. In the example illustrated in FIGS. 1 and 2, the receiving surface 40 of the armrest 34 is particularly suitable for receiving the elbow and/or forearm of a received occupant, and in particular, sitting on the associated seating area 12.

The armrest 34 is an adjustable armrest. In particular, the armrest 34 is an adjustable armrest according to the elevation direction Z.

The movable panel 36 of the armrest 34 comprises an upper panel portion 36A at least partially delimiting the receiving surface 40 and a side panel portion 36B separate from the upper panel portion 36A.

The movable panel 36 is movable in translation relative to the support 32 according to the elevation direction Z between the first position P1 (FIG. 1) and the second position P2 (FIG. 2). When the movable panel 36 is in the first position P1, the armrest 34 is said to be in the first position P1 and when the movable panel 36 is in the second position P2, the armrest 34 is said to be in the second position P2.

In the first position P1, a first distance D1 (not visible in the figures) is defined between the support 32 and the upper panel portion 36A according to the elevation direction Z and, in the second position P2, a second distance D2 is defined between the support 32 and the upper panel portion 36A according to the elevation direction Z.

In other words, the first distance D1 corresponds to a first height and the second distance D2 corresponds to a second height of the upper panel portion 36A relative to the support 32.

The first distance D1 is strictly less than the second distance D2.

Thus, in the second position P2, the upper panel portion 36A presents a second height that is strictly greater than the first height of the upper panel portion 36A in the first position P1.

For example, the first distance D1 is substantially zero. In other words, the upper panel portion 36A rests on a corresponding portion of the support 32 in the first position P1. Thus, in the example shown in FIG. 1, in the first position P1, the upper panel portion 36A is arranged on a part of the upper face 28 of the projecting console portion 26B. Advantageously, in the first position P1, the movable panel 36 is arranged in the receiving notch 38 and the faces of the body 26 of the center console 16 are substantially arranged edge to edge with the movable panel 36.

For example, in position P2, the second distance D2 is non-zero and at least equal to one centimeter (cm).

The armrest 34 presents, for example, substantially L-shaped in a cross-sectional plane. The cross-sectional plane is substantially perpendicular to the longitudinal direction X.

For example, the upper panel portion 36A is substantially flat.

The upper panel portion 36A extends substantially in a first plane.

For example, the first plane extends according to the longitudinal direction X. Furthermore, for example, the first plane is substantially perpendicular to the elevation direction Z.

The upper panel portion 36A is adjustable according to the elevation direction Z and is dependent on the position of the movable panel 36 relative to the support 32 according to the elevation direction Z.

The side panel portion 36B is separate from the upper panel portion 36A.

For example, the side panel portion 36B is substantially flat.

The side panel portion 36B extends substantially in a second plane separate from the first plane in which the upper panel portion 36A extends.

The second plane presents a non-zero angle with the first plane. Such a non-zero angle is, for example, greater than 2 degrees.

By way of illustration, the angle between the second plane and the first plane depends on the shape of the support 32.

For example, in a cross-sectional plane, the second plane in which the side panel portion 36B extends is inclined relative to the direction of elevation Z and presents, for example, an angle comprised between 20 degrees and 40 degrees with the direction of elevation Z, preferably an angle comprised between 25 and 35 degrees with the direction of elevation Z, such as an angle of 30 degrees with the direction of elevation Z. In such a case, the second plane presents, for example, an angle comprised between 50 degrees and 70 degrees with the first plane, preferably an angle comprised between 55 degrees and 65 degrees with the first plane, such as an angle of 60 degrees with the first plane.

Alternatively, the second plane extends according to the elevation direction Z. For example, the second plane is substantially perpendicular to the transverse direction Y. In such a case, the second plane is for example substantially perpendicular to the first plane. Thus, the side panel portion 36B is substantially perpendicular to the transverse direction Y.

Advantageously, the direction normal to the second plane in which the side panel portion 36B extends passes through an area occupied by an occupant sitting on the seating area 12 associated with the armrest 34.

The side panel portion 36B extends substantially facing the seating area associated with the armrest 34 according to the transverse direction Y.

In particular, the side panel portion 36B is arranged at least partially in the first position P1 in a space defined between the center console 16 and the first seating area 12.

The side panel portion 36B of the movable panel 36 comprises a heating element 42, in particular by radiation.

In particular, the heating element 42 is arranged to diffuse heat towards the seating area 12 associated with the armrest 34, in other words, towards the seating area 12 facing this heating element 42.

The heating element 42 is, for example, particularly arranged in a body of the side panel portion 36B. Alternatively, the heating element 42 covers the face of the body of the side panel portion 36B facing the seating area 12 associated with the armrest 34 (that is, the face of the body of the side panel portion 36B opposite that towards the support 32).

The heating element 42 presents an active configuration and an inactive configuration.

In the active configuration, the heating element 42 generates and diffuses heat. Conversely, in the inactive configuration, the heating element 42 does not generate nor diffuse heat.

The heating element 42 comprises, for example, at least one wire 44 conducting an electrical current. The heating element 42 is, for example, configured to be connected to the power supply of the vehicle.

As visible in FIGS. 1 and 2, the heating element 42 comprises, for example, a plurality of conductive wires 44.

For example, each conductive wire 44 presents the form of a loop.

By way of illustration, the loops are substantially concentric.

For example, each loop presents the shape of a circle, trapezoid or rectangle.

Alternatively, or additionally, the plurality of conductive wires 44 is a network of intersecting wires.

The conductive wires 44 are configured to generate heat when an electrical current is passed through them.

According to one specific example embodiment, the heating element 42 is a heating mat.

The heating mat comprises at least one structure in which the or a plurality of conductive wire(s) 44 are embedded.

The structure is, for example, a fabric. As an example, the fabric is a woven or non-woven textile made of polyethylene terephthalate (known as "PET").

Alternatively, the structure is made by injection molding of plastic material.

The heating element 42 extends substantially in a plane. The heating element 42 presents an area comprised between 200 $cm^2$ and 500 $cm^2$.

The heating element 42 is configured to be controlled between its active and inactive configurations according to a control law.

According to a particular example, the control law comprises, for example, activating the heating element 42 when the position of the movable panel 36 is separate from the first position P1.

In particular, the control law comprises activating the heating element 42 when the movable panel 36 is in the second position P2.

By way of illustration, the activation of the heating element is performed automatically, according to a control algorithm for the thermal comfort of the vehicle occupant, preferably when the movable panel is in its second position P2.

Alternatively, or additionally, the heating element 42 is controlled between its active and inactive configuration using one or more control buttons arranged in the vehicle passenger compartment 10. Such buttons are for example arranged on the center console 16.

The support 32 and the armrest 34 are mechanically connected to each other by the linkage mechanism (not visible in the figures).

The linkage mechanism is, for example, arranged between the support 32 and the movable panel 36.

As an example, the side panel portion 36B is mechanically connected to the support 32 by means of the linkage mechanism.

For example, the linkage mechanism comprises a sliding link.

The sliding link is configured to allow the movable panel 36 to move between the first position P1 and the second position P2.

The operation of the vehicle assembly 20 is described in the following.

Initially, with reference to FIG. 1, the movable panel 36 of the armrest 34 of the assembly 20 is in the first position P1.

In order to adjust the height of the armrest 34, an occupant of the vehicle interior slides the movable panel 36 from the first position P1 into the second position P2 according to the direction of elevation Z relative to the support 32.

In the second position P2, the heating element 42 is clear of the space between the center console 16 and the first seating area 12.

According to one particular embodiment, changing the position of the movable panel 36 from the first position P1 to the second position P2 causes the heating element 42 to be activated.

The occupant needs only slide the movable panel 36 according to the elevation direction Z relative to the support 32 to reposition the movable panel 36 to the first position P1.

The vehicle assembly 20 improves the comfort of the occupants of the vehicle interior 10 by allowing optimal heating of the vehicle interior 10.

In particular, due to the fact that the side panel portion 36B of the armrest 34 extending in the second plane comprises the heating element 42, the heating element 42 can be oriented towards the seating area 12 associated with the armrest 34. Such an arrangement of the heating element 42 allows for optimal orientation of the heat released by the heating element 42 and thus allows for optimal diffusion of the heat released by the heating element 42 in its active configuration. This results in increased thermal comfort for the occupant sitting in the seating area 12 associated with the armrest 34 by creating a thermal bubble around the seating area 12.

Additionally, because the movable panel 36 of the armrest 34 is movable in translation according to the elevation direction Z, the receiving surface 40 of the armrest 34 is adaptable to each occupant. In addition, the occupant can adapt the height of the heating element 42 to his needs for optimal heat distribution.

The fact that the side panel portion 36B of the armrest 34 is arranged at least partially in the space between the center console 16 and the associated seating area 12 in the first position P1 allows this space, which is generally not used, to be functional.

In addition, the heating element 42 is an additional heating point for the vehicle interior 10, thereby reducing the time to heat the interior 10 and particularly the portion of the interior 10 at the associated seating area 12.

Furthermore, the assembly 20 is suitable for both thermal and electric vehicles.

Because the heating element 42 is configured to be powered by the electrical system of the vehicle, it provides rapid heating when in the active configuration.

A vehicle interior 110 according to a second embodiment is described with reference to FIG. 3.

The passenger compartment 110 is described by difference from the passenger compartment 10 described in the first embodiment.

In the second embodiment, the passenger compartment 110 comprises at least a first seating area 112 of a first seat 122 and a second seating area 114 of a second seat 124, a center console 116, a first door panel 150 and a second door panel 152. For the first seating area 112 and the second seating area 114, the passenger compartment 110 includes a first assembly 120. Optionally the passenger compartment 110 comprises a second assembly 160 and a third assembly 170.

The first seating area 112 and the second seating area 114 are similar, respectively, to the first seating area 12 and the second seating area 14 described in the first embodiment.

The center console 116 is similar to the center console 16 described in the first embodiment.

The first door panel 150 is arranged on the side of the first seating area 112 opposite the side of the first seating area 112 arranged facing the center console 116.

The second door panel 152 is arranged on the side of the second seating area 114 opposite the side of the second seating area 114 arranged facing the center console 116.

The first assembly 120 is described only by difference from the assembly 20 described in the first embodiment.

The first assembly 120 comprises a support 132, a first armrest 134, a first mechanism for connecting the first armrest to the support 132, a second armrest 154 and a second mechanism for connecting the second armrest 154 to the support 132.

The support 132 is configured to support a second armrest 154.

Thus, the support 132 supports the first and second armrests 134 and 154.

For example, the support 132 presents a notch for receiving the second armrest 154 in the first position P1 of the second armrest 154.

Figure 3:
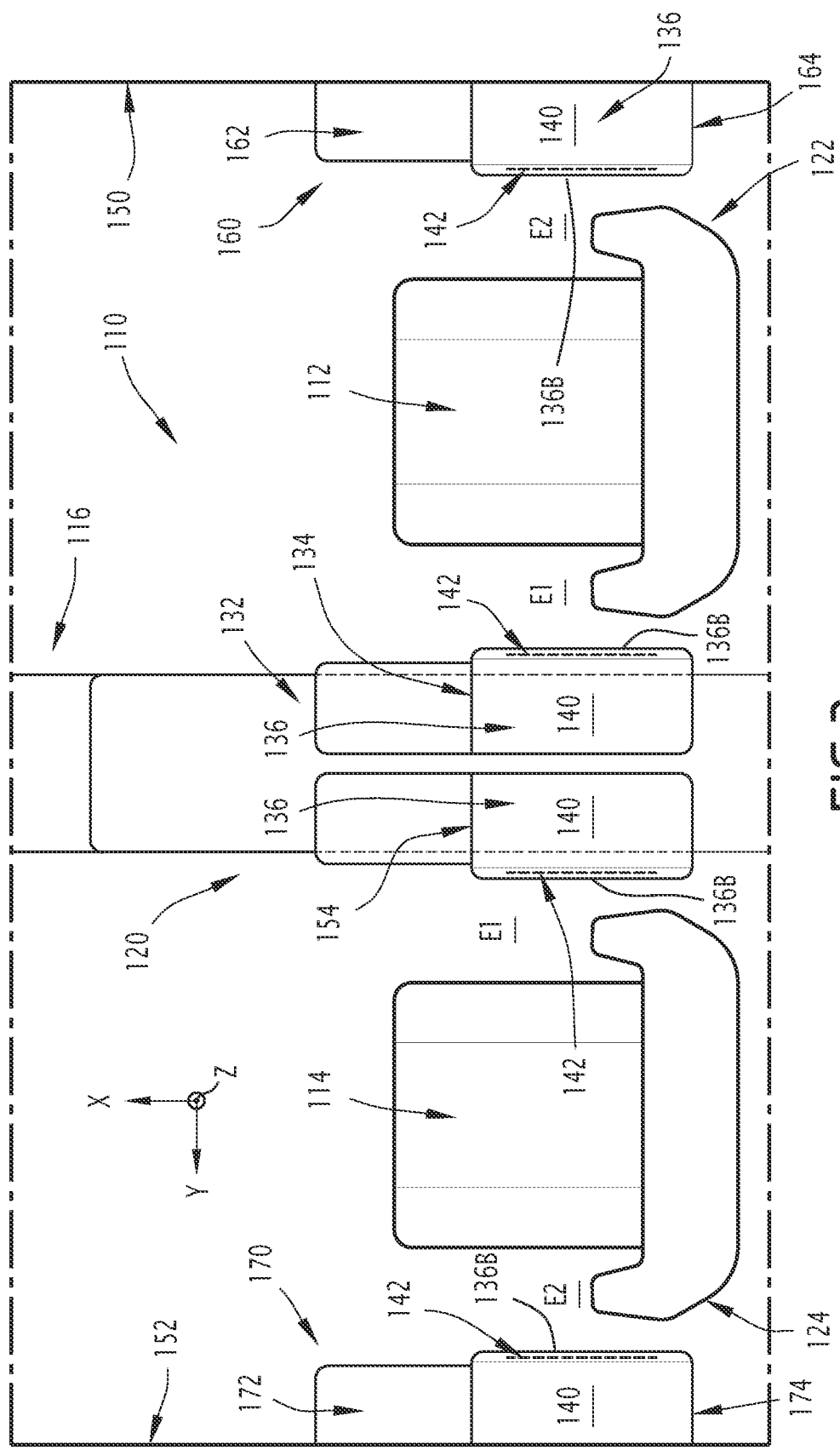
FIG. 3 is a schematic view from above of a part of a vehicle interior according to a second embodiment.

The support 132 comprises in the example shown in FIG. 3 a portion of the center console 116

The first armrest 134 and the second armrest 154 are each associated with a separate seating area of the first seating area 112 and the second seating area 114. For each armrest 134, 154, the upper panel portion of the movable panel 136 of that armrest 134, 154 is intended to receive the elbow and/or forearm of an occupant received in the associated seating area 112, 114, and the side panel portion 136B of the movable panel 136 of that armrest 134, 154 comprising the heating element 142 being configured to be arranged opposite the associated seating area 112, 114.

In particular, as visible in FIG. 3, the first armrest 134 is similar to the first armrest 34 described in the first embodiment and the first linkage mechanism is similar to the linkage mechanism described in the first embodiment. As visible in FIG. 3, the receiving surface 140 of the first armrest 134 is configured to receive the elbow and/or forearm of an interior occupant 110 of the vehicle received on the first seating area 112.

In particular, the heating element 142 of the side panel portion 136B of the movable panel 136 of the first armrest 134 is shown schematically in dotted lines. The heating elements 142 of the side panel portion 136B of the armrests of the other assemblies 160, 170 of the passenger compartment 110 are also shown schematically in dotted lines.

In the following, the second armrest 154 is described only by difference from relative to the first armrest 134.

The second armrest 154 differs from the first armrest 134 only in its arrangement relative to the support 132.

Advantageously, the second armrest 154 is associated with a seating area separate from the first seating area 112. In the present example visible in FIG. 3, said seating area is the second seating area 114. The second armrest 154 presents a receiving surface 140 separate from the receiving surface 140 of the first armrest 134. The receiving surface 140 of the second armrest 154 is intended to receive the elbow and/or forearm of an occupant received on the second seating area 114.

In particular, the side panel portion 136B of the movable panel 136 of the second armrest 154 is arranged at least partially in the first position P1 in the space E1 defined between the center console 116 and the second seating area 114.

The heating element 142 of the side panel portion 136B of the second armrest 154 is arranged in particular, to diffuse heat towards the second seating area 114.

The second linkage mechanism is similar to the linkage mechanism of the first embodiment.

The second linkage mechanism mechanically connects the second armrest 154 to the support 132 and allows translation of the movable panel 136 of the second armrest 154 according to the elevation direction Z between the first position P1 and the second position P2.

The second vehicle assembly 160 comprises a support 162 of a third armrest 164, and a mechanism for connecting the third armrest 164 to the support 162.

The second assembly 160 is separate from the first assembly 120.

The support 162 of the second assembly 160 is separate from the support 132 of the first assembly 120.

The support 162 of the second assembly 160 comprises, for example, a portion of the first door panel 150.

The third armrest 164 is described hereinafter only by difference from to the first armrest 134.

The third armrest 164 differs from the first armrest 134 only in its position in the passenger compartment 110 relative to the position of the first armrest 134.

Advantageously, the third armrest 164 is associated with a seating area. In the present example visible in FIG. 3, the associated seating area is the first seating area 112. The receiving surface 140 of the third armrest 164 is separate from the receiving surface 140 of the first armrest 134 and the second armrest 154 and intended to receive the elbow and/or forearm of an occupant received on the first seating area 112.

The side panel portion 136B of the movable panel 136 of the third armrest 164 is arranged at least partially in the first position P1 in a space E2 defined between the first door panel 150 and the first seating area 112 facing this side panel portion 136B.

The heating element 142 is arranged in the side panel portion 136B of the movable panel 136 of the third armrest 164 to diffuse heat toward the first seating area 112.

The linkage mechanism of the second assembly 160 is similar to the linkage mechanism of the first embodiment. The linkage mechanism mechanically connects the third armrest 164 to the support 162 and allows translation of the movable panel 136 of the third armrest 164 according to the elevation direction Z between the first position P1 and the second position P2.

The third vehicle assembly 170 comprises a support 172 for a fourth armrest, a fourth armrest 174, and a mechanism for connecting the fourth armrest 174 to the support 172.

The support 172 of the third assembly 170 is separate from the support 132 of the first assembly 120 and the support 162 of the second assembly 160.

The support 172 of the third assembly 170 comprises, for example, a portion of the second door panel 152.

The fourth armrest 174 is described hereinafter only by difference from the first armrest 134.

The fourth armrest 174 differs from the first armrest 134 only in its position in the passenger compartment 110 relative to the position of the first armrest 134.

Advantageously, the fourth armrest 174 is associated with a seating area. As visible in FIG. 3, the associated seating area is the second seating area 114. The receiving surface 140 of the fourth armrest 174 is separate from the receiving surface 140 of the first armrest 134, the second armrest 154, and the third armrest 164 and configured to receive the elbow and/or forearm of an occupant received on the second seating area 114.

The side panel portion 136B of the movable panel 136 of the fourth armrest 174 is arranged at least partially in the first position P1 in the space E2 defined between the second door panel 152 and the second seating area 114.

In particular, the heating element 142 is arranged in the side panel portion 136B of the movable panel 136 of the fourth armrest 174 to diffuse heat towards the second seating area 114.

The linkage mechanism of the third assembly 170 is similar to the linkage mechanism of the first embodiment. The linkage mechanism mechanically connects the fourth armrest 174 to the support 172 and allows translation of the movable panel 136 of the fourth armrest 174 according to the elevation direction Z between the first position P1 and the second position P2.

Advantageously, the first assembly 120 and the second assembly 160 are arranged such that the first armrest 134 and the third armrest 164 are arranged facing each other according to the transverse direction Y. In addition, the first assembly 120 and the third assembly 170 are arranged such that the second armrest 154 and the fourth armrest 174 are arranged facing each other according to the transverse direction Y. Such an arrangement creates a comfortable thermal bubble around each seating area 112, 114.

In addition, the fact that the movable panels 136 of the armrests 134, 154, 164 and 174 are arranged at least partially in the first position P1 in the generally unused space E1 or E2 makes these spaces E1 and E2 functional.

The invention claimed is:

1. The vehicle interior comprising at least one seating area being intended to receive at least a portion of a body of an occupant of the vehicle interior and at least one assembly comprising at least one armrest presenting a receiving surface for the elbow and/or forearm of an occupant of the vehicle interior and a support of the or each armrest, the or each armrest comprising a panel movable in translation relative to the support according to an elevation direction between a first position and a second position,
  wherein, for the or each armrest, the movable panel of this armrest comprises an upper panel portion delimiting at least in part the receiving surface of this armrest, the upper panel portion extending in a first plane, the movable panel of this armrest further comprising a side panel portion separate from the upper panel portion, extending in a second plane different from the first plane, the side panel portion comprising a heating element configured, when activated, to diffuse heat, and
  wherein the upper panel portion of the movable panel of the armrest of the assembly is intended to receive the elbow and/or the forearm of an occupant received in the seating area, and
  wherein the vehicle interior comprises at least one door panel arranged on a side of the at least one seating area, the vehicle interior comprising at least one additional vehicle assembly, the support of the additional vehicle assembly comprising a portion of the door panel.

2. The vehicle interior according to claim 1, comprising, for the or each armrest, at least one linkage mechanism connecting the movable panel of that armrest to the support, the linkage mechanism comprising a sliding link.

3. The vehicle interior according to claim 1, comprising two armrests, the support supporting the movable panel of each of the two armrests.

4. The vehicle interior according to claim 1, wherein the second plane extends substantially according to the elevation direction.

5. The vehicle interior according to claim 1, the or each armrest is a center console armrest or a door panel armrest of the interior of the vehicle.

6. The vehicle interior according to claim 1, wherein the heating element is a heating mat integrated into the side panel portion.

7. The vehicle interior according to claim 1, wherein the heating element extends substantially in the second plane, the heating element presenting an area comprised between 200 $cm^2$ and 500 $cm^2$.

8. The vehicle interior according to claim 1, wherein the heating element is configured to be controlled according to a control law, the control law comprising activating the heating element when the position of the movable panel is separate from the first position.

9. The vehicle interior according to claim 1, the upper panel portion of the movable panel of the armrest of the assembly being intended to receive the elbow and/or the forearm of an occupant received in the seating area.

10. The vehicle interior according to claim 9, comprising at least one door panel arranged on a side of the at least one seating area, the vehicle interior comprising at least one additional vehicle assembly, the support of the additional vehicle assembly comprising a portion of the door panel.

* * * * *